3,008,993
ALKENYL POLYAMINES

Thomas E. Lesslie, Mount Holley, N.C., and Robert J. O'Neill, Stoneham, Mass., assignors to Monsanto Chemical Company, St. Louis, Mo., a corporation of Delaware No Drawing. Filed Feb. 14, 1957, Ser. No. 640,062
7 Claims. (Cl. 260—583)

The present invention relates to the manufacture of alkenyl substituted amines and particularly to those amines of the aliphatic series that contain in the molecule long unsaturated chains of carbon atoms, preferably from 8 to 16 carbon atoms. They may be generally represented by the formula:

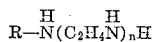

where R is a higher alkenyl radical containing one double bond and $n$ is an integer at least 1 but less than 5. Suitable higher alkenyl radicals include diisobutenyl, triisobutenyl, polypropenyl as for example, tetrapropenyl, and 1-tert-butyl-2-methylallyl. The new amines have been found valuable for use as agricultural chemicals, for example as nematocides, as fungicides and more specifically as surfactants.

The compounds of this invention are readily manufactured by the process set forth in detail in the examples hereinafter described wherein primary and secondary aliphatic polyamines are reacted with an alkenyl chloride.

The condensation of the alkenyl chloride and amine is carried out by heating at reflux temperature and under agitation, substantially one equivalent of the long chain alkenyl chloride with two or more equivalents of the amine. Following the reaction period, the amine hydrochloride is removed by appropriate means and the excess amine and unreacted chloride removed by distillation. The product may then be further purified, if desired.

The following examples are illustrative of the invention:

EXAMPLE 1

An alkenyl chloride was produced by reacting 76.2 parts by weight of sodium hypochlorite solution (of 11.7% by weight hypochlorite content) and 19.2 parts by weight of propylene tetramer in a vessel equipped with agitation, external cooling and temperature recording means. The vessel and contents were then cooled to below 10° C. and maintained at that temperature while slowly adding 12.25 parts of 36% hydrochloric acid. After the acid is all added, the mixture is agitated for approximately one-half hour and then is allowed to settle, following which the bottom layer is drawn off and discarded and the oily top layer is washed twice with water. The tetrapropenyl chloride so obtained is then reacted with an amine by the following typical procedure:

To a reaction vessel equipped with an agitator, a reflux condenser and temperature recording means, there were added 51.7 parts of diethylenetriamine and 30.7 parts of tetrapropenyl chloride. The mixture was agitated and slowly heated to a temperature of reflux (about 197° C.) and maintained thereat for approximately five hours. Thereupon while continuing the agitation, the mixture was allowed to cool to a temperature of substantially 140° C. and then allowed to settle. The bottom layer consisting of amine salt, namely diethylenetriamine hydrochloride, was then drawn off from the reactor, and the balance of the reaction product subjected to distillation at substantially 165° C. under a 45 mm. vacuum to remove the unreacted tetrapropenyl chloride and diethylenetriamine. The residue comprising the desired product, tetrapropenyl diethylenetriamine, may, if desired, be clarified by filtration through clay by suitable means.

EXAMPLE 2

Diisobutenyl chloride, believed to be composed mainly of 3-chloro-2,4,4-trimethyl-1-pentene, was prepared by charging into a suitable flask 2880 parts by weight (5.1 moles) of sodium hypochlorite solution (of 13.12% by weight hypochlorite content). The solution was cooled to 0° C. and 561.1 parts by weight (5.0 moles) of diisobutylene (80% 2,4,4-trimethyl-1-pentene, 20% 2,4,4-trimethyl-2-pentene) added with no evidence of any reaction. Then approximately 500 parts by weight (5.1 moles) of 37% hydrochloric acid was added dropwise and the temperature allowed to rise and be maintained at 20° C.±5°. The addition required 50 minutes after which the reaction was agitated for 10 minutes with cooling. The clear oily layer was separated off in a separatory funnel and washed once with water and filtered. The yield of diisobutenyl chloride was 95% of the theoretical.

To a suitable reactor was charged 365.5 parts by weight (2.5 moles) of triethylentetramine and the amine heated to 145° C. Then 146.67 parts by weight (1.0 mole) of diisobutenyl chloride prepared as described was added dropwise over a 25 minute period at 145–144° C. The mixture was then heated at reflux for 6 hours, allowed to cool and the amine hydrochloride layer separated off. The crude product was topped to 145° C./7 mm. and 105 parts of distillate collected. The product, composed mainly of N-(1-tert-butyl-2-methylallyl)triethylenetetramine, comprising a light yellow liquid, was obtained in 74.7% theory yield. Analysis gave 20.07% nitrogen as compared to 21.8% calculated for $C_{14}H_{32}N_4$. The product was soluble in all common solvents.

EXAMPLE 3

Tetraethylene pentamine was substituted for the triethylene tetramine in the foregoing example. Into a suitable reactor was charged 453 parts by weight (2.5 moles) of triethylene tetramine and the amine heated to 144° C. Then, 146.67 parts by weight (1.0 mole) of diisobutenyl chloride as above was added dropwise over a 20 minute period at 144–141° C. The reaction mixture was then heated to reflux for 6 hours, allowed to cool and the amine hydrochloride layer separated off. The remaining crude product was topped and the cut in the range B.P. 202–217° C./5 mm. was a light yellow liquid soluble in all common solvents. The product, composed mainly of 1-(1-tert-butyl-2-methylallyl)tetraethylenepentamine, so obtained analyzed 24.1% nitrogen as compared to 23.4% calculated for $C_{16}H_{37}N_5$. The residue consisted of a slightly darker but nevertheless useful product slightly less pure than the foregoing. It contained 20.9% nitrogen.

EXAMPLE 4

A mixture comprising 628.2 parts by weight (3.0 moles) of a propylene polymer of approximately 15 carbon atoms and 230 parts by weight (3.1 moles) of sodium hypochlorite was cooled to 5° C. by means of an ice-acetone bath and 305.6 parts by weight (3.1 moles) of 37% hydrochloric acid added dropwise, allowing the temperature to rise to and be maintained at 20° C.±5°. The addition required 45 minutes after which the mixture was agitated for an hour at 15–20° C. The product layer was separated, washed once with water and filtered through Attapulgus clay to yield a product containing 14.6% chlorine.

To a suitable reactor was charged 515.8 parts by weight (5.0 moles) of diethylenetriamine and the amine heated to 118° C. Then 486.8 parts by weight (2.0 moles) of the chlorinated propylene polymer was added dropwise over a 45 minute period at 118–120° C. and the mixture heated for one-half hour up to 176° C. After standing overnight the by-product amine hydrochloride had settled out so the mixture was heated slowly to melt the hydrochloride and finally heated to 200° C. No refluxing was observed so the temperature was allowed to drop to 178° C. and maintained there for 2 hours. The hydrochloride was separated off and the product layer topped to 130° C./8 mm. The N-polypropenyl diethylenetriamine was a dark amber liquid.

EXAMPLE 5

Ethylenediamine was substituted for the diethylenetriamine in Example 4. To a suitable reactor was charged 150.3 parts by weight (2.5 moles) of ethylenediamine and the amine heated to 114° C. Then, 243.4 parts by weight (1.0 mole) of the chlorinated propylene polymer prepared as described was added dropwise over a period of 25 minutes at 114° C. to 125° C. The reaction mixture was then heated at reflux (128–131° C.) for 6 hours and allowed to cool. The amine hydrochloride layer was separated and the crude product stripped to 160° C./5 mm. The N-polypropenyl ethylenediamine was a very dark amber liquid soluble in common solvents and very slightly soluble in water.

EXAMPLE 6

Triisobutenyl chloride was prepared by slurrying together 404.9 parts by weight (3.0 moles) of triisobutylene (composed mainly of 2,2,4,6,6-pentamethylheptene-3 and 2-neopentyl-4,4-dimethyl pentene-1) and 230.8 parts by weight (3.1 moles) of sodium hypochlorite solution (13.68 g./100 ml. of solution) in a suitable reactor at 0° C. Then 306 parts by weight (3.1 moles) of 37% hydrochloric acid were added dropwise over a 30 minute period at 20° C. ±5° C. and the mixture agitated for an additional 30 minutes at 10–15° C. The product layer was separated, washed once with water and fractionated at 5 mm. pressure. The triisobutenyl chloride was a water clear liquid, B.P. 70–74° C., chlorine 17.7% as compared to 17.5% calculated for $C_{12}H_{23}Cl$.

Into a suitable reactor was charged 361.1 parts by weight (3.5 moles) of diethylenetriamine and the amine heated to 160° C. Then 202.7 parts by weight (1.0 mole) of the triisobutenyl chloride prepared as described was added dropwise over a 10 minute period. The mixture was then heated to reflux for 5 hours (202° C.) The crude product was fractionated and the 1-(triisobutenyl) diethylenetriamine fraction B.P. 148–164° C. was an off-white liquid insoluble in water but soluble in common solvents. Analysis for nitrogen gave 15.6% compared to 15.7% calculated for $C_{16}H_{28}N_3$.

EXAMPLE 7

Ethylenediamine was substituted for diethylenetriamine in Example 6. A suitable reactor was charged with 202.7 parts by weight (1.0 mole) of the triisobutenyl chloride and heated to 118° C. Then, 150.3 parts by weight (2.5 moles) of ethylenediamine was added dropwise with heating to maintain the temperature at 118–122° C. during the 50 minute addition period. The mixture was then brought to refluxing temperature (122–129° C.) and maintained at that temperature for 6 hours. The mixture was then allowed to cool and the amine hydrochloride layer separated off. The crude product was fractionated and the fraction boiling at 118–120° C./6 mm. comprising the desired N-triisobutenylethylenediamine was a clear liquid slightly soluble in water and soluble in most common solvents. Analysis gave 11.8% nitrogen as compared to 12.4% calculated for $C_{14}H_{30}N_2$.

EXAMPLE 8

In this example chlorine is employed as the chlorinating agent in the preparation of the alkenyl chloride. Into a suitable reactor there was charged 1300 parts (7.75 moles) of propylene tetramer and the polymer cooled to 2° C. by means of an ice bath. The reactor was fitted with an inlet tube for the chlorine feed and 550 parts of chlorine were added over a period of approximately 3½ hours. The ice bath temperature was maintained below 17° C. during the addition. After the addition was complete, the mass was washed once with 1% caustic followed with two water washes. After filtering through diatomaceous silica the product turned dark so it was again washed with 1% caustic followed by a water wash. Then 2 parts of activated carbon were added and the product filtered to yield 1532 parts of chlorinated propylene tetramer analyzing 19.7% chlorine.

To 202.5 parts (1.0 mole) of the chlorinated propylene tetramer there was added 300 parts (5.0 moles) of ethylenediamine and the mixture heated to a temperature of reflux (about 120° C.). The product was maintained at 120–125° C. for 7½ hours, then the amine hydrochloride layer was separated and the crude product remaining topped to 126° C./11 mm. The residue comprising the desired N-(tetrapropenyl)ethylenediamine was an amber liquid analyzing 11.1% nitrogen as compared to 12.4% calculated for $C_{14}H_{30}N_2$. It was insoluble in water but soluble in common solvents.

Other chlorides and amines than those set forth in the examples may be employed in producing our preferred type of product. Thus alkenyl chlorides containing from 8 to and including 16 carbon atoms have been employed to react with aliphatic cyclic and non-cyclic primary and secondary polyamines to produce the desired products. With aromatic amines and with tertiary aliphatic amines, other than the desired product results. Obviously, variation in the conditions of producing the alkenyl chloride will result in a chloride of different chlorine content. Another variable is the chloride-amine ratio employed but in this instance we have found that a molar ratio of at least 1:2 and preferably of 1:3 is required. However, such products are included within the scope of our invention.

Other examples of our invention are set forth in the following tabular form:

Table I

| Olefin | Chlorine-olefin molar ratio | Amine employed | Moles amine/moles chloride | Refractive index of product at 25° C. |
| --- | --- | --- | --- | --- |
| $C_{12}$ | 1.6 | Diethylenetriamine | 3.2/1 | 1.4860 |
| $C_{12}$ | 1.0 | ------do------ | 3.2/1 | 1.4800 |
| $C_{12}$ | 1.0 | Triethylenetetramine | 3.0/1 | 1.4891 |
| $C_{12}$ | 1.0 | Tetraethylenepentamine | 3.0/1 | 1.5018 |
| $C_{14}$ | 1.0 | Diethylenetriamine | 3.0/1 | 1.4798 |
| $C_{15}$ | 1.0 | ------do------ | 3.0/1 | 1.4821 |

The desirable properties as surfactants of products of the type set forth are exemplified by the following results with tetrapropenyl diethylenetriamine (designated as amine in the table) employed in the concentrations shown:

Table II

| Conc. used | Surface tension | | | Interfacial tension | | | Spreading coefficient | | |
| --- | --- | --- | --- | --- | --- | --- | --- | --- | --- |
| | 1.0% | 0.25% | 0.125% | 1.0% | 0.25% | 0.0125% | 1.0% | 0.25% | 0.0125% |
| Amine | 28.8 | 28.9 | 29.0 | 1.8 | 2.3 | 3.5 | +3.9 | +3.3 | +2.0 |
| Amine+½ mole HCl | 28.2 | 29.0 | 29.3 | 1.5 | 2.3 | 3.1 | +4.8 | +3.2 | +2.1 |

The following results were obtained with the same amine mentioned immediately above in the well-known Draves Wetting Test:

*Table III*

| Concentration | 0.5% | 0.25% | 0.125% | 0.0625% | 0.031% |
|---|---|---|---|---|---|
| Amine | Inst. | Inst. | 12.9 | 125 | +180 |
| Amine+½ mol HCl | Inst. | 6.4 | 15.2 | 94 | +180 |

Similar testing of N,N'-diisobutenyl ethylenediamine and N-isobutenyl diethylenetriamine gave wetting times of 45 minutes and 30 minutes respectively at concentrations of 0.5%.

Using the same long chain amine employed in the two preceding tests and determining lather formation by the Ross-Miles method, it was found that lather development was but slight at the start of the test and nil or practically nil after 5 minutes both in neutral and acid solution. This feature enhances the usefulness of the products as detergents employed in automatic washing machines as well as in other important ways.

To show the utility of the alkenyl substituted amines of this invention as nematocides, a suspension of the nematode *Panagrellus redivivus* in water was prepared and the motility of the organisms in the presence of 0.1% of the test material observed through a microscope. The nematode in aqueous suspension will flex its body at a regular rate and as the nematocide takes effect, the rate of flexing is decreased until death of the parasite occurs. In this experiment the control containing no added toxicant showed undiminished activity after 24 hours whereas complete destruction of the nematode was effected with the following:

N-(tetrapropenyl)ethylenediamine
N-(tetrapropenyl)diethylenetriamine
N-(tetrapropenyl)triethylenetetramine
Tetrapropenyl chloride-tetraethylene pentamine reaction product
N-(1-tert-butyl-2-methylallyl)ethylenediamine 1,7-ditetrapropenyl)diethylenetriamine was ineffective when tested as above.

Many of the compounds are fungicides. For example, N-(tetrapropenyl)diethylenetriamine, N-(tetrapropenyl)triethylenetetramine, N-(tetrapropenyl)ethylenediamine, N-triisobutenyl-ethylenediamine and N-(1-tert-butyl-2-methylallyl)triethylenetetramine are useful industrial preservatives and applicable for the preservation of wood, leather, textiles and paint from attack by microorganisms.

While we have set forth in detail the preferred ingredients and proportions thereof, these are capable of variation and modification without departing from the spirit of the invention. Therefore, we do not wish to be limited to the precise details as described but do desire to include within the scope of our invention such variations and modifications as fall within the purview of the appended claims.

This application is a continuation-in-part of application Serial No. 438,341, filed June 21, 1954, now abandoned.

What is claimed is:

1. A higher alkenyl polyamine of the structure

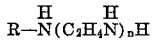

where $n$ is an integer from 1 to 4 inclusive and R is a higher alkenyl radical within the range of 8–16 carbon atoms inclusive selected from the class consisting of polypropenyl and polyisobutenyl radicals.

2. A higher alkenyl polyamine of the structure

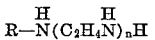

where $n$ is an integer from 1 to 4 inclusive and R represents the diisobutenyl radical.

3. A higher alkenyl polyamine of the structure

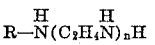

where $n$ is an integer from 1 to 4 inclusive and R represents the triisobutenyl radical.

4. A higher alkenyl polyamine of the structure

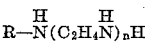

where $n$ is an integer from 1 to 4 inclusive and R is polypropenyl within the range of 12–16 carbon atoms inclusive.

5. A higher alkenyl polyamine of the structure

where $n$ is an integer from 1 to 4 inclusive and R represents the 1-tert-butyl-2-methylallyl radical.

6. A higher alkenyl polyamine of the structure

where R is polypropenyl within the range of 12–14 carbon atoms inclusive.

7. A higher alkenyl polyamine of the structure

where R is tetrapropenyl.

References Cited in the file of this patent

UNITED STATES PATENTS

| 2,172,822 | Tamele et al. | Sept. 12, 1939 |
| 2,244,712 | Kyrides | June 10, 1941 |
| 2,246,524 | Kyrides | June 24, 1941 |
| 2,267,204 | Kyrides | Dec. 23, 1941 |
| 2,267,205 | Kyrides | Dec. 23, 1941 |
| 2,844,599 | Rendall et al. | July 22, 1958 |

FOREIGN PATENTS

| 578,694 | Great Britain | July 9, 1946 |

UNITED STATES PATENT OFFICE
CERTIFICATE OF CORRECTION

Patent No. 3,008,993

November 14, 1961

Thomas E. Lesslie et al.

It is hereby certified that error appears in the above numbered patent requiring correction and that the said Letters Patent should read as corrected below.

Column 4, Table I, column 1, line 6 thereof, for "$C_{15}$" read -- $C_{16}$ --; column 6, lines 41 to 43, the structure should appear as shown below instead of as in the patent:

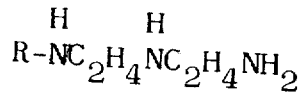

Signed and sealed this 17th day of April 1962.

(SEAL)
Attest:

ESTON G. JOHNSON
Attesting Officer

DAVID L. LADD
Commissioner of Patents